Sept. 2, 1941.   J. VISSER   2,254,861
ASH RECEPTACLE AND MOUNTING
Filed July 1, 1939    2 Sheets-Sheet 1
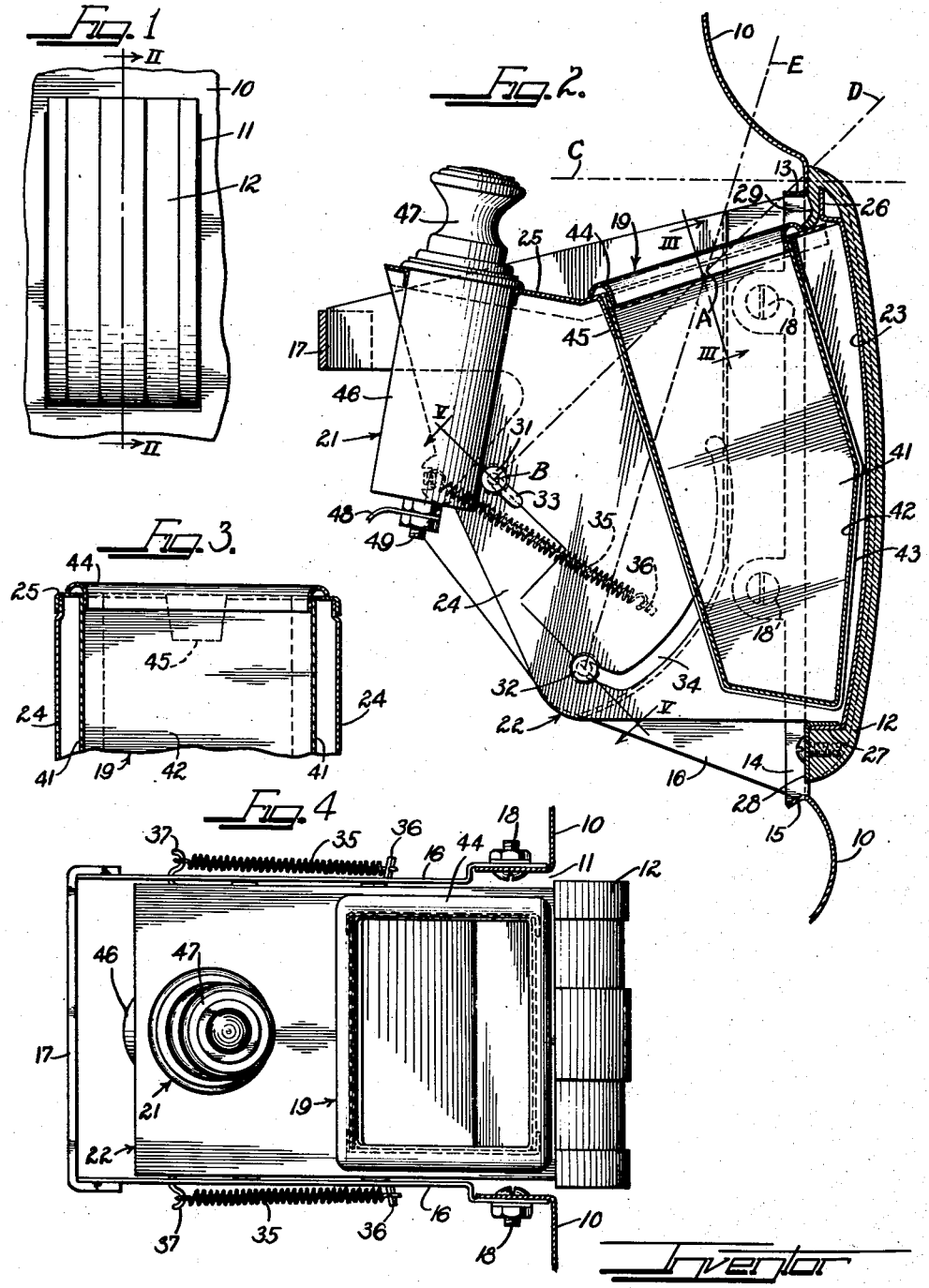
Inventor
JOHN VISSER
by Charles H. Hill Attys.

Sept. 2, 1941.　　　　　J. VISSER　　　　　2,254,861
ASH RECEPTACLE AND MOUNTING
Filed July 1, 1939　　　2 Sheets-Sheet 2
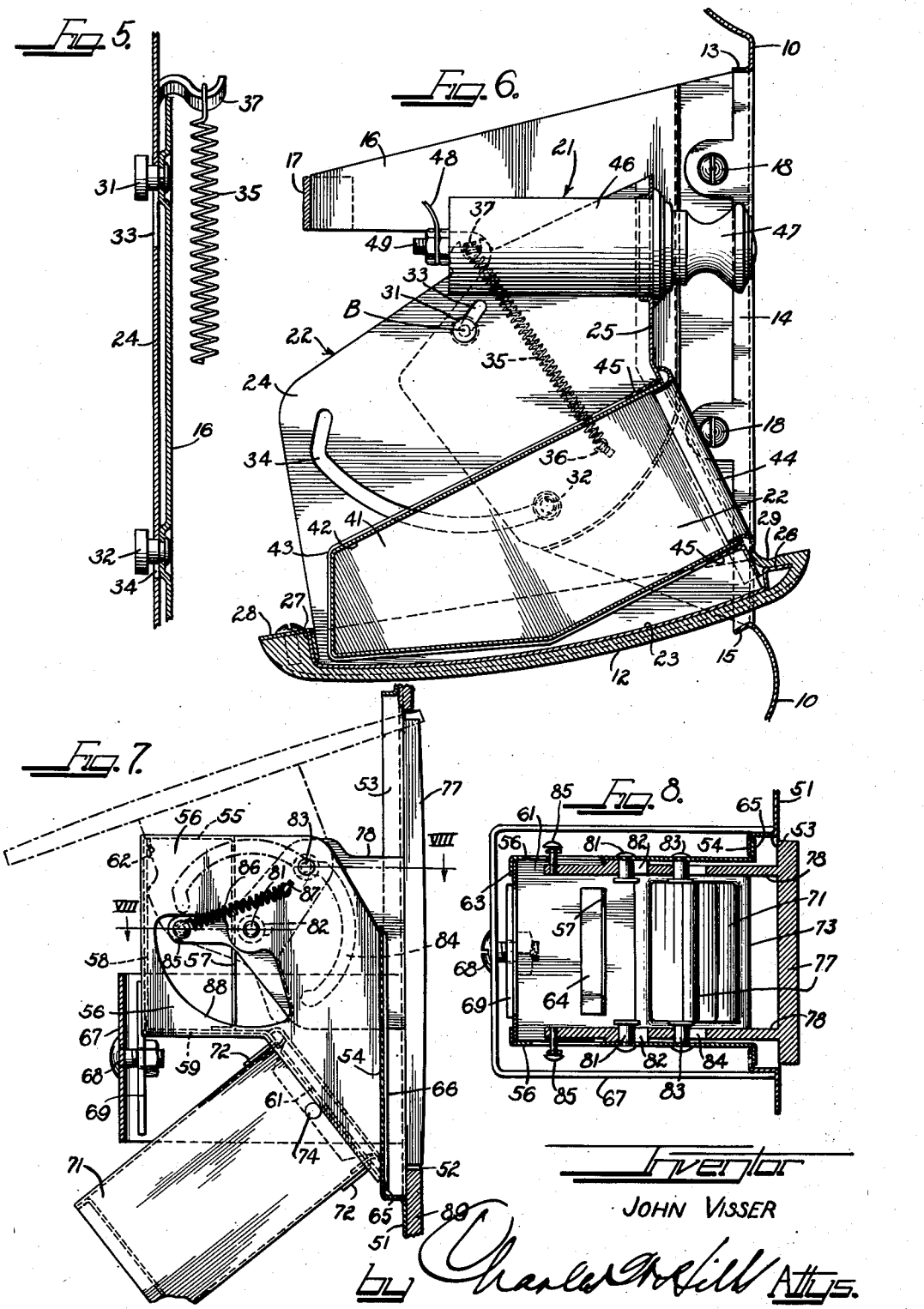
Inventor
JOHN VISSER Patented Sept. 2, 1941

2,254,861

UNITED STATES PATENT OFFICE 2,254,861

ASH RECEPTACLE AND MOUNTING

John Visser, Grand Rapids, Mich., assignor, by mesne assignments, to Reconstruction Finance Corporation, Detroit, Mich., a corporation of the United States Application July 1, 1939, Serial No. 282,434

8 Claims. (Cl. 131—234)

This invention relates to an ash receptacle or other smoker's accessory adapted to be carried by a substantially vertical panel, such as the instrument panel of an automobile, and more particularly to an ash receptacle mounted behind such a panel and adapted to be entirely hidden when not in use.

One of the principal objects of this invention is to provide an ash receptacle mounting which carries an ash receptacle behind an opening in a panel and which provides a disappearing closure for the opening.

I am aware that mountings of this general type have been provided by myself and others in which the closure member is similar to that employed on a roll-top desk, but it is more specifically an object of my invention to provide a mounting of this general type in which the closure member is solid and rigid, rather than articulated or flexible.

Another object of this invention is to provide an ash receptacle mounted in an opening in a panel and carried on the back of the closure for the opening.

Another object of this invention is to provide an ash receptacle and closure which are securely held in both open and closed positions by means of an over-center spring.

A further object of this invention is to provide a closure mechanism for an opening in a panel, especially adapted for use with an ash receptacle, which closure is movable from a position in which it overlaps the panel on at least one side of the opening through the opening to a position behind the panel.

Other objects and features of this invention will more fully appear from the following description taken in connection with the accompanying drawings, which illustrate two of the preferred embodiments thereof, and in which:

Figure 1 is a face view of a portion of an automobile instrument panel, showing one of the preferred forms of my novel ash receptacle and mounting in closed position;

Figure 2 is a cross-section on the line II—II of Figure 1, looking in the direction indicated by the arrows;

Figure 3 is a partial section on the line III—III of Figure 2, looking in the direction indicated by the arrows;

Figure 4 is a plan view of the form of the invention shown in Figures 1, 2 and 3, the instrument panel being shown in section;

Figure 5 is a partial sectional view on the line V—V of Figure 2, looking in the direction indicated by the arrows;

Figure 6 is a view similar to Figure 2, but showing the ash receptacle and mounting in open position;

Figure 7 is a side view, partly in section, of a modified form of the invention; and Figure 8 is a horizontal section on the line VIII—VIII of Figure 7, looking down in the direction indicated by the arrows.

As shown on the drawings:

The form of the invention shown in Figures 1 to 6 is mounted on a panel 10, which may be an automobile instrument panel, having a rectangular opening 11 which is closed by the ornamental face member 12 of the device. The edges of the panel 10 around the opening 11 are bent back to form flanges 13, 14 and 15 at the top, sides and bottom of the opening to strengthen the panel around the opening and to provide a convenient means for supporting the ash receptacle mounting frame 16 and 17.

The frame 16—17 is formed of a pair of side plates 16 whose forward edges are secured to the side flanges 14 of the panel opening by bolts 18, and which are connected together at the rear by a cross piece 17 spot-welded to rearwardly projecting extensions on the side plates 16. The face member 12, the ash receiver 19 and the lighter 21 are carried by a retainer 22 which is movably supported between the frame side plates 16. The retainer 22 is generally box-like in shape and is composed of a front 23 and two sides 24, which are integrally formed of a single piece of sheet metal, and a top 25 having depending side flanges spot-welded or otherwise secured to the upper edges of the retainer sides 24.

The front 23 of the retainer is shaped to fit the back of the face member 12 and is provided at its upper end with an upwardly projecting lug 26 which fits up into a notch in the upper part of the face member 12. The lower edge of the retainer front 23 is formed into a rearwardly projecting flange 27, under which the bottom of the face member 12 extends and to which it is secured by means of a clip 28. The back of the face member 12 is formed to provide a transverse groove 29 at its upper end, this groove being located just in front of the ash receiver 19 when the device is open and serving as a holder for a cigar or cigarette.

Each side 24 of the retainer is secured to the adjacent side plate 16 of the frame by a pair of guide pins 31 and 32 riveted to the frame side plates 16 and slidable in slots 33 and 34 in the retainer sides 24. The guide pins 31 and 32 and the slots 33 and 34 are arranged so that the retainer 22 and the parts 12, 19 and 21 carried by it can first swing back slightly about a center A (shown in Figure 2) near the top of the opening 11 in the panel 10 and then swing down and around about a second center B located approximately level with the middle of the panel opening 11 and in back of the panel a distance equal to approximately one-half of the height of the panel opening. This is accomplished by making the first portion of each of the slots 33 and 34 approximately concentric with the center A, and by shaping the second portions of the slots 33 and 34 so that they will be approximately concentric with the second center B after the retainer 22 has been swung the desired amount about the first center A.

Thus, each of the two slots 33 and 34 may consist of two distinct portions which are preferably at an angle to each other. However, in the particular embodiment of the invention shown in the drawings, the second center B coincides with one of the guide pins 31, and hence the portion of the slot 33 which is concentric with the second center B becomes merely the rounded end of the slot 33. Although the first portions of the slots 33 and 34 must be approximately concentric with the first center A, these portions of the slots are short enough so that it is not necessary that they be curved. All that is necessary is that the lines D and E perpendicular to those portions of the slots 33 and 34 intersect at the center A, as shown in Figure 2.

In the particular form of the invention shown, in which the upper end of the face member 12 rests against the face of the panel 10 when the ash receptacle is in closed position, as shown in Figure 2, it is also necessary that the first center of rotation A of the retainer 22 be below, or at least very near to a line C which extends perpendicular to the engaging surfaces of the face member 12 and the panel 10. Of course, if the portion of the face member 12 which abuts the panel 10 is at the bottom of the opening 11, instead of at the top, the pivot point A should then be located above the line perpendicular to the abutting surfaces of the face member and the front of the panel, instead of below.

With the above described arrangement of the guide pins 31 and 32 and guide slots 33 and 34, it will be seen that the movable ash retainer assembly can first be swung about the center A near the top of the face member 12 by pressing in upon the bottom of the face member 12, and that the movable ash retainer assembly can be swung far enough about this center A to bring the lower end of the face member 12 within the panel opening 11. After this initial movement of the movable ash retainer assembly has taken place, the entire assembly can be swung around the center B, the guide pins 31 serving as pivots, to the position shown in Figure 6 in which the face member 12 is approximately horizontal and extends back from the bottom of the panel opening, and in which the ash receiver or box 19 and the lighter 21 are swung around so as to be accessible through the panel opening 11 uncovered by the movement of the face member 12.

It will also be appreciated that the particular arrangement of guide pins and guide slots shown is only an example of those which can provide the proper movements, and that many variations may be made, as by placing the slots in the stationary frame members and placing the guide pins upon the movable ash retainer assembly.

In order to prevent any accidental displacement of the movable ash retainer assembly 22, 12, etc., from either its open or closed position a pair of springs 35 are provided to resiliently hold it in either position. One spring 35 is placed on each side of the device and extends from a lug 36 struck out from the frame side plate 16 to a lug 37 formed on the retainer side 24. The lugs 36 and 37 are placed so that the spring 35 extends below the first center or axis of rotation A of the ash retainer assembly when the device is in the closed position shown in Figure 2, and also extends above the second center or axis of rotation B when the device is in its open position shown in Figure 6. This enables a single set of springs 35 to resiliently hold the device in either open or closed position. It is also desirable that the springs 35 extend below the second center or axis of rotation B when the device is in its closed position shown in Figure 2, because this greatly facilitates the operation of the device. With this location of the lugs 36 and 37 and the springs 35, the springs 35 pass from one side of the second center or axis of rotation B to the other side as the ash retainer assembly is swung from open to closed position, and an over-center arrangement is provided which will automatically swing the movable ash retainer assembly to fully open position whenever it is more than half-way open, and automatically swing it to closed position whenever it is less than half-way open.

The ash receiver or box 19 carried by the movable retainer 22 may be drawn in one piece or may be made of several pieces of sheet metal, as shown in the drawings. In the construction illustrated, the ash receiver 19 comprises a pair of flanged side plates 41 and a continuous strip of sheet metal 42 forming the front, bottom and back of the ash receiver and spot-welded to the flanges 43 of the side plates. The open or upper end of the ash box 19 is finished off by means of a stamped rim or flange 44 having a rounded cross-section and spot welded to the remainder of the ash box. The ash box 19 fits through a square hole in the top plate 25 of the movable retainer 22 and is frictionally retained in position by means of lugs 45 which are bent down from the edges of the openings and press against the front and back of the ash box. Thus, the ash box 19 is frictionally retained and can be readily withdrawn from its support whenever it is necessary to empty it.

The lighter 21 is carried behind the ash box 19 by the retainer top plate 25 and comprises a conventional socket portion 46 which is fixed to the retainer top plate 25, and a removable hand piece 47, which fits into the socket 46 and carries the heating element in the conventional manner. A suitable flexible electric wire 48 is connected to the terminal 49 at the bottom of the lighter socket 46 and carries the current necessary to operate the lighter.

It will be noted from Figure 6, that, when the retainer 22 is in its open position, the axis of the lighter 21 is only a very short distance above the principal axis B about which the retainer swings. If the lighter 21 is of the type which is caused to heat by pressing the hand piece 47 down into the socket 46, the pressure transmitted to the retainer 22 will tend to swing it towards its closed position, but this tendency will be slight enough to be unobjectionable if the axis of the lighter 21 is placed as close to the axis of swing B of the retainer 22 as shown in the drawings, or can be completely eliminated by inclining or lowering the axis of the lighter so that it passes through or below the axis of swing B of the retainer.

A modified form of the invention is shown in Figures 7 and 8. This form differs from that previously described chiefly in that the ash box and lighter are carried by a stationary bracket structure, instead of being secured to the movable closure for the panel opening. In this form of the invention, the opening 52 in the instrument panel 51 is surrounded by a rearwardly directed flange 53, the edge of the flange across the bottom and half way up each side being formed into a narrow lip 54 extending in towards the center of the opening in a plane parallel to the main portion of the panel 51.

The frame of the ash receiver comprises two pieces of sheet metal, one of which forms the top 55 and sides 56 of the retainer and a partition 57 extending down between the two sides, and the other of which forms a back wall 58 and the horizontal and sloping portions 59 and 61 of the bottom of the retainer frame. The top of the back wall 58 is spot-welded to a flange 62 depending from the rear edge of the retainer top 55, and the side edges of the back wall 58 and the bottom 59, 61 are spot-welded to flanges 63 extending in from the back and bottom edges of the retainer sides 56. The vertical partition 57, which is bent down from the front edge of the retainer top 55, is considerably narrower than the rest of the retainer, so that its lateral edges are spaced from the retainer sides 56, but it is rigidly supported by having its lower end 64 resting flat upon and spot-welded to the horizontal part 59 of the retainer bottom.

At the front of the retainer, the side walls 56 and the bottom 61 are bent outwardly to form flanges 65 and 66 adapted to seat against the front surface of the lip 54 extending around the lower part of the panel opening 52. The retainer is held in place with its front flanges 65 and 66 seated against the panel opening lip 54 by means of a U-shaped bracket 67 which extends around the back of the retainer and has its ends bearing against the back of the panel 51 at either side of the panel opening. The bracket 67 is connected to the retainer by a bolt 68 which extends through the back of the bracket 67 and a lug 69 spot-welded to the back wall 58 of the retainer and depending below it. By tightening the bolt 68, the legs of the bracket 67 are forced against the back of the panel 51, and the front flanges 65 and 66 on the retainer are pressed against the front of the panel opening lip 54. Thus, the entire assembly is held firmly in position.

The sloping forward portion 61 of the retainer bottom carries a rectangular ash box or receptacle 71, the ash box 71 fitting through a rectangular hole in the retainer bottom 61 and being frictionally retained by resilient fingers 72 which are bent down from the sides of the opening and press against the outside of the ash box 71. The edges of the opening through which the ash box 71 fit are concealed by a rim member 73 forming the mouth of the ash box 71. The ash box 71 is also provided with a cross bar 74 at its mouth which may be used to aid in withdrawing the ash box 71 from the retainer for emptying and also for knocking the ashes off a cigarette or for extinguishing the cigarette.

An electric lighter is to be carried above the ash box 71 by the vertical partition 57 of the retainer. The socket 75 of the lighter can be secured to the partition 57 in any suitable manner with its axis horizontal, and the hand piece of the lighter may be withdrawn from the socket for use in the conventional manner.

The panel opening 52, through which access is had to the ash receptacle 71 and lighter 76, is normally closed by a door 77 which is mounted so that it can be swung up and back through the opening 52 and out of the way. The door 77, which may be formed of a die-casting, a plastic, or any suitable material, is provided with a pair of integral arms 78 which project back and lie on either side of the lighter 75—76 and against the sides 56 of the retainer. Each door arm 78 and the adjacent retainer side 56 are connected to each other by two pin and slot connections which allow the door 77 to be moved back out of the panel opening 52 and to be swung around to the position shown in dotted lines in Figure 7.

In the particular form of the invention illustrated, one of the pin and slot connections between each arm 78 and the adjacent retainer side member 56 comprises a pin 81 riveted to the side member and slidable in a short slot 82 perpendicular to the main part of the door 77. The other pin and slot connection comprises a second pin 83 riveted to the retainer side member 56 and slidable in a long slot 84 in the door arm 78, the slot 84 having a short initial portion parallel to the first slot 82 and a long curved portion concentric with the end of the short slot 82 nearest the main portion of the door 77. The short slot 82 and the short straight portion of the other slot 84 permit the door 77 to be slid back horizontally out of the door opening 52, whereupon the door 77 may be rotated about the axis of the pin 81 as a center, this rotation being permitted by the long curved portions of the long slot 84.

In order to resiliently hold the door 77 in either closed or open position, each of the door arms 78 extends back beyond the pin 81 which serves as a pivot and carries a laterally projecting pin 85 which is connected by a tension spring 86 to a lug 87 on the retainer side 56. The spring 86 is located on the outside of the retainer, and the retainer side 56 is provided with a suitable aperture 88 through which the pin 85 on the door arm extends.

It will be noted from Figure 7 that the pin 85 and lug 87 between which the spring 86 extends are located so that, when the door 77 is in closed position, the spring 86 extends above the pivot pin 81. With the spring 86 thus located, it not only tends to pull the door forward into its closed position, but also aids in the last portion of the movement of the door as it is being swung down. The spring 86 is arranged so that it passes below and in front of the pivot pin 81 when the door 77 is in open position, and it tends to hold the door in that position. There is thus provided an overcenter arrangement which tends to swing the door 77 to its fully open position when it is almost fully open, and which tends to swing it to its closed position when it is almost closed.

The panel 51 may be formed and decorated so as to present an ornamental and harmonious appearance with the face of the door 77, but a more attractive and rich appearance may be presented by setting the panel 51 itself back a little from the face of the door 77, and surrounding the door and door opening by a die-cast or plastic escutcheon 89 ornamented and finished to harmonize with the door 77. The escutcheon 89 may be a single member extending entirely around the door opening 52 or it may be made in two small sections, one above and one below the door opening, as may be desired.

From the above description and the accompanying drawings, it will be seen that I have provided an ash retainer and mounting which is effectively concealed when not in use and is highly accessible and convenient to use. It will also be seen that I have provided an ash receiver and mounting which, in either of the forms illustrated or in other forms which may be devised by a skilled mechanic, lies entirely behind the instrument panel and presents no projections against which the occupant of a motor vehicle might be thrown by a sudden stoppage of the vehicle. It will also be understood, of course, that the two forms of the invention which have been shown and described are shown only by way of example and that numerous details of construction may be varied through a wide range without departing from the principles of this invention, and it is, therefore, not the purpose to limit the patent granted hereon otherwise than necessitated by the scope of the appended claims.

I claim as my invention:

1. A door structure comprising supporting means adapted to be fixed to a wall member in back of an opening therein, a closure for said opening and adapted to overlap said wall member at one side and in front of said opening, and mechanism interconnecting said supporting means and said closure for guiding said closure in a preliminary backward swinging movement about an axis near said side of said opening and for thereafter guiding said closure in a main swinging movement about an axis spaced a substantial distance behind said closure.

2. A door structure comprising supporting means adapted to be fixed to a wall member in back of an opening therein, a closure for said opening, supporting means fixed to and in back of said closure, and two sets of pin and slot connections between said supporting means, the slots of each of said sets of connections having two portions, the first portion of the slots being curved and substantially concentric and the second portion of the slots being curved and substantially concentric and having a different center than the first portions, one of said sets of slots guiding said closure in a preliminary slight backward movement into said opening and the other set of slots thereafter guiding said closure in a greater and swinging movement to the rear of said opening.

3. A door structure as set out in claim 2 and in which one edge of said closure is adapted to overlap in front of said wall member, and in which the center of curvature of the first portions of said slots is close to a line drawn perpendicular to the surface of said wall member overlapped by said closure.

4. An ash retainer structure comprising supporting means adapted to be fixed in back of an opening in a panel, a closure for said opening, mechanism interconnecting said supporting means and said closure for guiding said closure in a vertical swinging movement from a position closing said opening to a position in which the center of said closure lies a substantial distance behind said opening, and an appliance fixed with respect to said closure and rendered accessible by said movement, said appliance being of the type which is operated by axially directed pressure applied thereto and the axis thereof extending close to the axis of said swinging movement.

5. In an ash receptacle structure, a framework adapted to be secured behind an opening in a panel member and including a pair of side plates, a box-like retainer located between said side plates and comprising a front and a top and two sides, means interconnecting said retainer sides and said side plates for selectively holding said retainer with the front thereof in position to close said opening or with the top thereof in position to face said opening, and an ash box carried by said top.

6. In an ash receptacle structure, a framework adapted to be secured behind an opening in a panel member and including a pair of side plates, a box-like retainer located between said side plates and comprising a front and a top and two sides, and two pin and slot connections between each of said side plates and each of said retainer sides, each of said pin and slot connections including a slot having a portion thereof concentric with an axis adjacent to the top and front of said retainer, each of said slots also having a portion concentric with an axis spaced a substantial distance below the top of said retainer and a substantial distance in back of the front of said retainer, and an ash box carried by said retainer top.

7. In a smoking accessory, a framework adapted to be secured behind an opening in a panel member and including a pair of side plates adapted to be located approximately in line with the edges of said opening, a box-like retainer located between said side plates and comprising a front and a top and two sides, said front being adapted to close said opening when said retainer is in closed position, and said top carrying a smoker's accessory and being accessible through said opening when said retainer is in open position, and two pin and slot connections between each of said retainer sides and the adjacent side plate, each of said pin and slot connections including a slot having a short portion extending perpendicularly to a line passing through a single common axis located near the front and top of said retainer, and at least one of the pin and slot connections associated with one retainer side and frame side plate having the slot thereof formed with a relatively long arcuate portion having a center of curvature located a substantial distance below said retainer top and a substantial distance behind said retainer front.

8. In an ash receptacle structure, a framework adapted to be secured behind an opening in a panel member and including a pair of side plates, an inner frame structure located between said side plates and including a front and two sides, a box carried by said inner frame structure normally disposed to the rear of and concealed by said front, and means interconnecting said sides and said side plates for selectively holding said inner frame structure with the front thereof in position to close said opening or with the upper end of the box thereon in position to face said opening so as to be accessible.

JOHN VISSER.